(12) United States Patent
Needham et al.

(10) Patent No.: US 6,671,515 B1
(45) Date of Patent: Dec. 30, 2003

(54) METHOD AND APPARATUS FOR SELECTING COMMUNICATION CELLS IN A WIRELESS COMMUNICATION SYSTEM

(75) Inventors: Michael J. Needham, Palatine, IL (US); Timothy J. Wilson, Rolling Meadows, IL (US); Leigh Chinitz, Silver Spring, MD (US)

(73) Assignee: Motorola, Inc., Schaumburg, IL (US)

( * ) Notice: Subject to any disclaimer, the term of this patent is extended or adjusted under 35 U.S.C. 154(b) by 460 days.

(21) Appl. No.: 09/588,262

(22) Filed: Jun. 6, 2000

(51) Int. Cl.$^7$ ................................................ H04Q 7/20
(52) U.S. Cl. ....................................... 455/458; 455/518
(58) Field of Search ................................. 455/458, 426, 455/456, 434, 435, 517, 518, 519, 516, 416, 414.1; 370/335, 341, 342; 379/205.01

(56) References Cited

U.S. PATENT DOCUMENTS

| | | |
|---|---|---|
| 5,056,109 A | 10/1991 | Gilhousen et al. |
| 5,216,692 A | 6/1993 | Ling |
| 5,257,183 A | 10/1993 | Tam |
| 5,265,119 A | 11/1993 | Gilhousen |
| 5,267,262 A | 11/1993 | Wheatley, III |
| 5,323,452 A | 6/1994 | Dickman et al. |
| 5,383,219 A | 1/1995 | Wheatley, III et al. |
| 5,465,391 A * | 11/1995 | Toyryla ....................... 455/422 |
| 5,485,486 A | 1/1996 | Gilhousen et al. |
| 5,548,808 A | 8/1996 | Bruckert et al. |
| 5,590,177 A | 12/1996 | Vilmur et al. |
| 5,621,723 A | 4/1997 | Walton, Jr. et al. |
| 5,691,979 A | 11/1997 | Cadd et al. |
| 5,835,860 A * | 11/1998 | Diachina ..................... 455/458 |
| 5,920,549 A | 7/1999 | Bruckert et al. |
| 5,987,012 A | 11/1999 | Bruckert et al. |
| 6,032,047 A * | 2/2000 | Cerwall et al. ............. 455/450 |
| 6,115,388 A | 9/2000 | Chinitz et al. |
| 6,169,906 B1 | 1/2001 | Bruckert |
| 6,188,767 B1 | 2/2001 | Needham et al. |
| 6,233,461 B1 | 5/2001 | Chinitz et al. |
| 6,333,921 B1 | 12/2001 | Grube et al. |
| 6,377,560 B1 * | 4/2002 | Dailey ........................ 370/329 |
| 6,442,396 B1 * | 8/2002 | Schmidt et al. ............. 455/518 |
| 6,516,200 B1 * | 2/2003 | Schmidt et al. ............. 455/518 |

FOREIGN PATENT DOCUMENTS

| | | | | |
|---|---|---|---|---|
| EP | 0 828 355 A2 | | 3/1998 | |
| GB | 2 271 690 A | * | 4/1994 | |
| JP | 410136447 A | * | 5/1998 | ............ H04Q/7/38 |
| WO | WO 94/17644 A1 | * | 8/1994 | |

* cited by examiner

Primary Examiner—Charles Appiah
(74) Attorney, Agent, or Firm—Jeffrey K. Jacobs

(57) ABSTRACT

In a wireless communication system (100) having a plurality of communication cells (115, 117), and a plurality of mobile stations (118) operating within selected ones of the multiple communication cells (115, 117), a method and an apparatus for selecting those communication cells (115, 117). Within each communication cell (115, 117), a base station (112) transmits a message directed to the mobile stations (118), and detects a response indicator in the selected ones of the plurality of communication cells (115, 117). The message may be a broadcast page message transmitted by the base station (112). The response indicator may be an impulse radio-frequency energy transmission generated by the plurality of mobile stations (118) operating within the selected ones of the plurality of communication cells (115, 117). The base station (112) may detect the impulse radio-frequency energy transmission on a control channel or during a predetermined time window period (303, 410, 413, 416) following transmission of the message. The base station (112) directs call traffic to the plurality of mobile stations (118) in the selected ones of the plurality of communication cells (115, 117).

12 Claims, 2 Drawing Sheets

500

METHOD AND APPARATUS FOR SELECTING COMMUNICATION CELLS IN A WIRELESS COMMUNICATION SYSTEM

FIELD OF THE INVENTION

The present invention relates generally to wireless communication systems, and more particularly, to a method and an apparatus for selecting communication cells in a wireless communication system having a mobile station.

BACKGROUND OF THE INVENTION

A cellular communication system is a complex network of systems and elements. Typical elements include (1) a radio link to the mobile stations (cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller or switch, typically a mobile switching center (MSC), for routing calls within the system, and (5) a link to the land line or public switch telephone system (PSTN), which is usually also provided by the MSC.

One aspect of a wireless communication system such as, but not limited to, a code division multiple access (CDMA) based communication system, is to transmit messages between the network elements of the system and remote or mobile stations operating within the system. At times, it may be desirable to transmit a message to a group of mobile stations.

The presence of mobile stations within communication cells may be determined to minimize the number of base stations involved in a group message by transmitting a message such as a broadcast paging message to the mobile stations. The mobile stations may respond to the message thus identifying the base stations of communication cells containing mobile stations of the group. This Agroup message= may be sent by using what is often referred to as a dispatch call, which is a call that is directed to each mobile station of the group. To ensure all mobile stations of the group receive the dispatch call, one method would be to send the message in each communication cell of the communication system. This arrangement, however, may inefficiently use communication resources, such as when there are no mobile stations that are associated with a group located within a communication cell. A communication resource is still assigned for that communication cell, and that assignment of a communication resource is an inefficient use. The message may instead be sent out to those communication cells containing group members if paging is done at each communication cell to locate the group members.

However, attempts to respond to the page message by multiple mobile stations in an uncoordinated fashion and without power control would result in interference to other calls in the communication system. Current CDMA systems allow mobile stations receiving a phone call to respond to broadcast paging messages on a CDMA control channel. However, the current CDMA systems only allow one mobile station to respond because paging responses from multiple mobile stations on a CDMA control channel would likely collide, and therefore, results in retries and delayed responses. Furthermore, the current CDMA systems use tight power control to overcome the interference caused by each mobile station. This generally requires that users accessing the system initially perform an access probe procedure, in which the page response would be sent multiple times at increasing power levels until a response is heard by the base station. However, this can result in a significant delay in responding.

Therefore, a need exists for a method and an apparatus that selects the communication cells in a wireless communication system having a mobile station to which a dispatch call is directed without delay or interference to other calls.

DETAILED DESCRIPTION OF THE PREFERRED EMBODIMENTS

Figure 1:
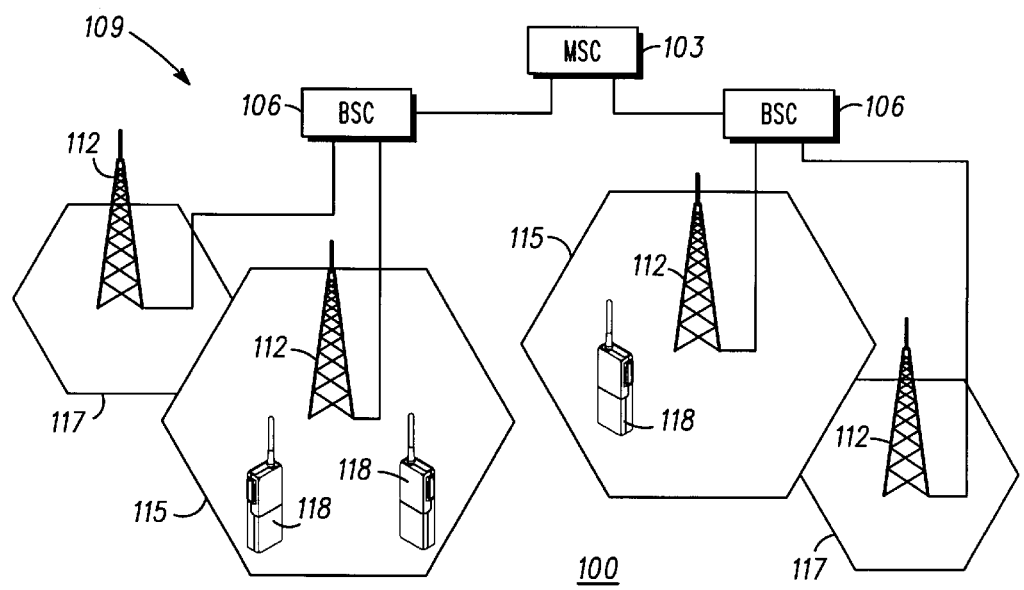
FIG. 1 is a block diagram representation of a wireless communication system that may be adapted to operate in accordance with the preferred embodiments of the present invention.

The present invention provides a method and an apparatus for selecting communication cells in a wireless communication system that contain mobile station members to which a dispatch call is directed. The mobile stations may include, but are not limited to, mobile stations operated by members in a talk group such as, but not limited to, police officers and fire fighters. The preferred embodiment of the present invention establishes that at least one member of a talk group is present in a communication cell before a base station, which services that communication cell, dispatches a group call to the communication cell.

The base stations in every communication cells transmit a message such as, but not limited to, a group call page, to notify members of a talk group of a dispatch call. Talk group members may respond to the group call page with an impulse radio-frequency energy transmission during a time window period following transmission of the group call page by the base stations. The impulse radio-frequency energy transmission may include, but is not limited to, a short duration burst of radio frequency energy containing no information, and may be restricted in frequency to the bandwidth of the radio system. The transmission by a mobile station in a communication cell indicates the presence of that mobile station, and hence, at least one talk group member is in that communication cell. Therefore, if a base station receives a transmission of the impulse from a mobile station in a communication cell, then at least one talk group member is in the communication cell, and the base station may dispatch the group call to that communication cell. The mobile station preferably transmits a response within a time window period after the group call page to minimize interference that would otherwise affect other calls in the communication system. Restricting the response to a small time window period also serves to minimize the chance of a false response due to, for instance, a random burst of noise on the radio channel. Particularly in a wireless communication system such as, but not limited to, a CDMA communication system, interference caused by the mobile stations may be minimized with power control. Therefore, the transmission of an impulse as a response to a group call page may limit the interference affecting the base station servicing those mobile stations without power control, by restricting the response to a very short duration within a defined time window period.

In an alternate embodiment of the present invention, multiple talk group members in a communication cell may respond at different time window periods to minimize interference with other mobile stations responding to a group call page that could result from a large number of units responding in the same time window period. Multiple talk group members may respond after a random delay in such as, but not limited to, ALOHA fashion, within multiple time window periods to avoid collision between the responses by the talk group members. ALOHA, which was named by the University of Hawaii, is an access technique that allows stations to transmit new messages on the channel as they are generated. The ALOHA random access scheme has no restriction on when a base station may transmit a message. In the ALOHA scheme, a base station transmits any time it has a message and monitors for a transmission from a mobile station. Alternatively, the slotted ALOHA scheme may be used by restricting random transmissions to fixed time slots or time window periods. Thus, all mobile stations must maintain a time reference to transmit a response.

Moreover, if a talk group member recognizes a response from another talk group member while waiting to transmit a response, then that talk group member need not respond at all. For example, Member #1 of Talk Group XYZ responds to a group call page and Member #2 of Talk Group XYZ, who is awaiting to respond to the group call page, recognizes that the group call page has been responded by Member #1 then Member #2 need not respond to the group call page. If Member #2 does not respond then that would minimize the number of mobile stations responding to the group call page. Therefore, multiple window periods minimize the interference from the power produced by mobile stations responding to a group call page and increase response time by the base stations.

As noted, the present invention is described in terms of several preferred embodiments, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communication (GSM), the IS-95A Code Division Multiple Access (CDMA) digital cellular, the Personal Communications System (PCS) and variations and evolutions of these protocols. As shown in FIG. 1, a wireless communication system 100 includes a mobile switching center (MSC) 103, a plurality of base station controllers (BSC) 106 servicing a total service area 109. Each BSC 106 has associated therewith a plurality of base stations 112 servicing communication cells, generally shown as 115 and 117, within the total service area 109. MSC 103, BSC 106, and base stations 112 are specified and operate in accordance with the applicable standard or standards for providing wireless communication services to mobile stations 118 operating in communication cells 115, 117 and each of these elements are commercially available from Motorola, Inc. of Schaumburg, Ill.

Multiple access wireless communication between base stations 112 and mobile stations 118 occurs over radio frequency (RF) channels, which provide physical paths to transmit communication signals such as voice, data, and video. Base station-to-mobile station communications occur on a forward-link channel, while mobile station-to-base station communications occur on a reverse-link channel.

A communication system using code division multiple access (CDMA) channelization is suitable for use with the various embodiments of the present invention. Such a communication system is well known and described in detail in *TIA/EIA Interim Standard IS-95A, Mobile Station-Base Station Compatibility Standards for Dual-Mode Wideband Spread Spectrum Cellular Systems*, Telecommunications Industry Association, Washington, D.C., July 1993 (IS-95A), and all addenda and revisions thereto, including but not limited to *TIA/EIA Interim Standard IS-96*, (IS-96), the disclosure of which is hereby expressly incorporated herein by reference.

In a CDMA communication system, such as the communication system 100, the MSC 103 and the BSC 106 determine the communication cells 115, 117 in the service area 109 that mobile stations 118 are within to direct calls to a minimum number of base stations 112 and hence, more efficiently utilize communication resources. The MSC 103 and the BSC 106 transmit a message to the base stations 112 located in communication cells 115, 117 within the service area 109. The message may be, but are not limited to, a broadcast page message. A plurality of base stations 112 transmit the message to the mobile stations 118 within a communication cell 115, 117 to establish the presence of at least one member of a talk group is operating a mobile station 118 in that communication cell 115, 117 before dispatching a call. The mobile stations 118 receiving the page message generate a response indicator such as, but not limited to, an impulse radio-frequency energy transmission, on a CDMA channel to indicate the receipt of the message from a base station 112. The impulse radio-frequency energy transmission may also be on a TDMA control channel. The MSC 103 and the BSC 106 direct a dispatch call or a group call request to the base station 112 within the communication cells 115 where at least one mobile station 118 is located, i.e., where a mobile station 118 generated a response indicator. In contrast, if a base station 112 did not detect a response indicator from any mobile stations 118 in a communication cell 117 then the MSC 103 and the BSC 106 will not direct the call to the base station 112 servicing the communication cell 117 where no mobile station responded to the message. Therefore, communication resources are more efficiently utilized by selecting the communication cells 115, 117 with at least one mobile station 118 within those communication cells 115.

Figure 2:
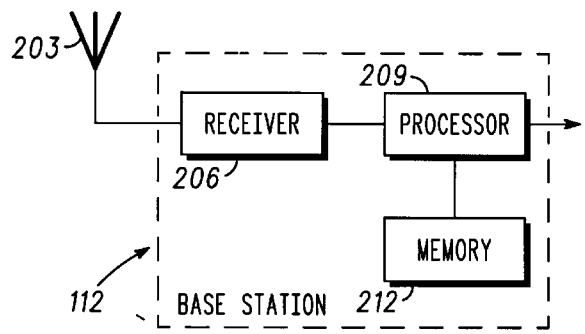
FIG. 2 is a block diagram of a base station associated with a wireless communication system.

Referring to FIG. 2, the base station 112 is adapted to respond and to receive a response indicator such as, but not limited to, an impulse radio-frequency energy transmission, by a mobile station 118 to notify that a member of a talk group is in a communication cell 115. The base station 112 includes an antenna 203, a receiver 206, a processor 209, and a memory 212 operatively coupled as is well known. The antenna 203 is connected to the receiver 206, which may receive an impulse radio-frequency energy transmission from the mobile stations 118. The processor 209, which is coupled to the receiver 206 and the memory 212, executes a program or a set of operating instructions to operate the preferred embodiment of the invention. The processor 209 may also be connected to the BSC 106 to receive instructions from the BSC 106. The memory 212 stores the program or operating instructions to operate the preferred embodiment of the present invention. The base station 112 transmits a message through the antenna 203 to the mobile stations 118 within the communication cell 115 that the base station 112 is providing services. A mobile station 118, which received the message from the base station 112, may respond with a response indicator to indicate that at least one mobile station 118 is present in the communication cell 115 that the base station 112 is providing services. The base station 112 may receive the response indicator through the antenna 203, which is processed by the processor 209 with the program or the set of operating instructions stored in the memory 212 of the base station 112. The BSC 106 instructs the base station 112 through the processor 209 on how to proceed. Particularly, the BSC 106 may instruct the base station 112 to transmit a dispatch call or a group call request to the mobile stations 118 within the communication cell 115.

Figure 3:
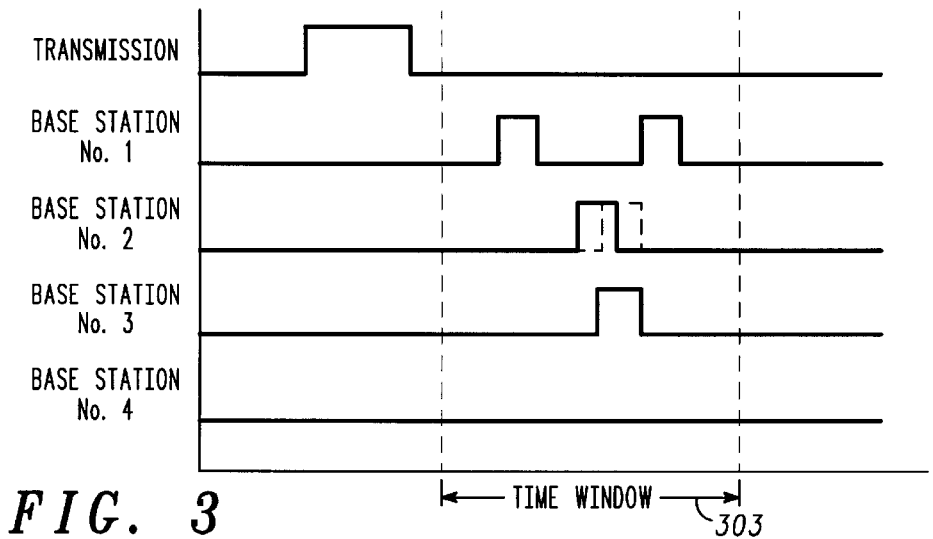
FIG. 3 is a timing diagram representation of a wireless communication system that may be adapted to operate in accordance with the preferred embodiments of the present invention.

As shown in FIG. 3, a base station 112 in a communication cell 115, 117 may or may not receive a response after transmitting a message. The base stations 112 may encounter the following situations after transmitting a message. First, a base station 112 may receive a plurality of responses by mobile stations 118 from a communication cell 115 within a time window period 303 as in Base Station #1. Second, a base station may receive a plurality of responses by mobile stations 118 from a communication cell 115 that may overlap in time within the time window period 303 as in Base Station #2. Third, a base station 112 may receive a response by a mobile station 118 from a communication cell 115 within the time window period 303 as in Base Station #3. Finally, a base station 112 may not receive any response within the time window period 303 as in Base Station #4. Mobile stations 118 may respond within the time window period 303 after the transmission of a message by the base station 112 to minimize the interference caused by the mobile stations 118. As noted above, in an alternate embodiment of the present invention, other mobile stations 118 in a communication cell 115 need not respond if any one of the plurality of mobile stations 118 within the same communication cell 115 responded to the message earlier. Minimizing the number of mobile stations 118 that respond to a message by a base station 112 would minimize interference to other members in the system without power control of the mobile stations 118.

Figure 4:
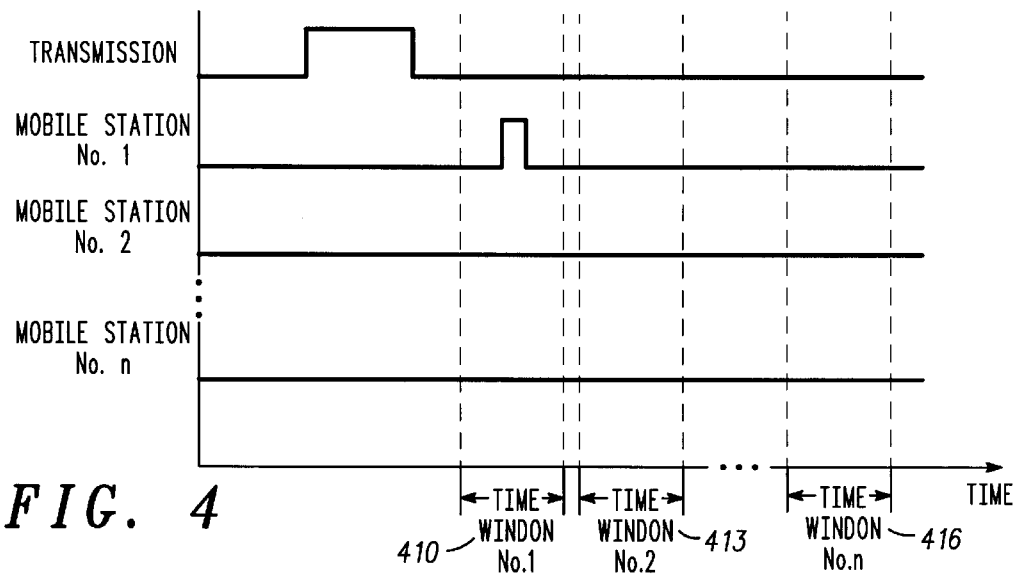
FIG. 4 is a timing diagram representation of a wireless communication system that may be adapted to operate in accordance with an alternate embodiment of the present invention.

Another alternate embodiment of the present invention may assign different time window periods 410, 413, 416 to each mobile station 118 within a communication cell 115. As shown in FIG. 4, a base station 112 in a communication cell 115 may or may not receive a response from each and every mobile stations 118 within the same communication cell 115 after transmitting a message. As mentioned above, a plurality of time window periods 410, 413, 416 minimize the interference from the power produced by the mobile stations 118 responding to a group call page and increase response time by the base station 112. For example, Mobile Station #1 may be assigned to time window period #1 410, Mobile Station #2 and all other mobile stations through Mobile Station n may be assigned to time window periods from time window period #2 413 through time window period n 416, respectively. Mobile Station #1 within a communication cell 115 may respond to a transmission sent by a base station 112 servicing that communication cell 115 within time window period #1 410. Mobile Station #2 and all other mobile stations 118, which include all mobile stations through Mobile Station n, may not need to respond to the transmission sent by the base station 112. Mobile Stations #2 through n may detect the impulse sent by Mobile Station #1 during time window period #1 410. Therefore, Mobile Stations #2 through n may not respond to the page sent by the base station 112 during time window period #2 413 through time window period n 416, respectively.

Figure 5:
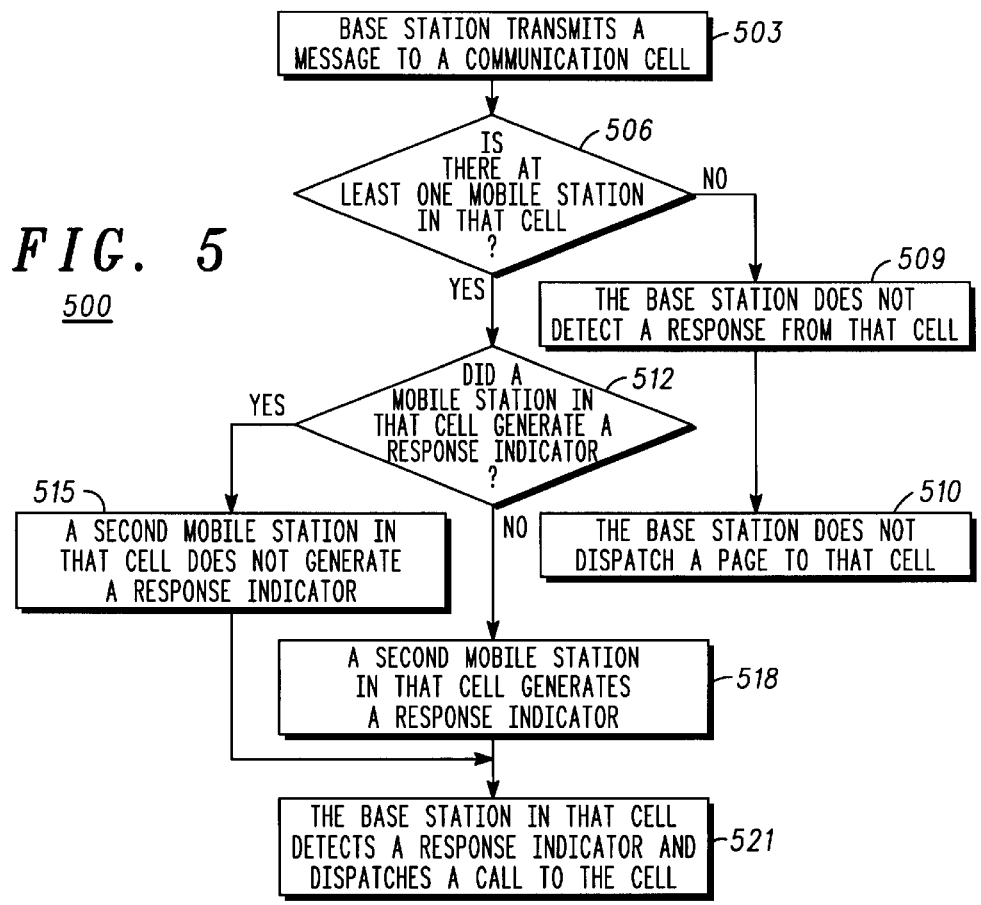
FIG. 5 is a flow diagram representation of a wireless communication system that may be adapted to operate in accordance with the preferred embodiments of the present invention.

In accordance with the preferred embodiments of the present invention, and with references to FIG. 5, a method 500 for selecting communication cells in a wireless communication system is illustrated.

Method 500 begins at steps 503 and 506 with a base station 112 transmitting a message to a communication cell 115, 117 in a wireless communication system to determine whether at least one mobile station 118 is in that communication cell 115, 117. At step 509, if no mobile station is in that communication cell 117 then the base station 112 may not detect a response indicator transmitted from a mobile station within that communication cell 117. However, if at least one mobile station is within that communication cell 115 then the base station 112 may detect a response indicator transmitted from a mobile station 118 within that communication cell 115. At step 512, a mobile station 118 may generate a response indicator such as, but not limited to, an impulse radio-frequency energy transmission, to establish that at least one mobile station is within that communication cell 115. However, if a communication cell 115 has a plurality of mobile stations 118 then the base station 112 may not detect a response indicator for each and every mobile stations 118 located in that cell 115 at step 515. Some mobile stations 118 in that communication cell 115 may recognize that a mobile station 118 in the same communication cell 115 generated a response indicator earlier to respond to the message. Nonetheless, at step 518, a mobile station 118 generates a response indicator if the mobile station 118 did not recognize that another mobile station 118 has generated a response indicator. Thus, the base station 112 detects a response indicator and dispatches a call to the communication cell 115 where at least one mobile station 118 generated a response indicator to establish presence within that communication cell 115 at step 521.

Many changes and modifications could be made to the invention without departing from the fair scope and spirit thereof. The scope of some changes is discussed above. The scope of others will become apparent from the appended claims.

What is claimed:

1. In a wireless communication system having a plurality of communication cells and a plurality of mobile stations operating within selected ones of the plurality of communication cells, a method for determining the selected ones of the plurality of cells, the method comprising the steps of:

within each cell transmitting a message directed to the plurality of mobile stations;

detecting a response indicator in the selected ones of the plurality of cells, wherein the response indicator comprises an impulse radio-frequency energy transmission generated by at least one of the plurality of mobile stations operating within the selected ones of the plurality of cells;

receiving at a second mobile station operating within the one of the selected ones of the plurality of communication cells the message;

detecting at the second mobile station the impulse radio-frequency energy transmission; and foregoing generation at the second mobile station of a second impulse radio-frequency energy transmission.

2. The method of claim 1, further comprising the steps of directing call traffic to the plurality of mobile stations in the selected ones of the plurality of cells.

3. The method of claim 1, wherein the wireless communication system comprises a code division multiple access communication system.

4. The method of claim 1, wherein the message comprises a broadcast page message.

5. The method of claim 1, wherein the step of detecting a response indicator comprises detecting the impulse radio-frequency energy transmission on a control channel.

6. The method of claim 1, wherein the step of detecting a response indicator comprises detecting the impulse radio-frequency energy transmission during a predetermined detection window period following transmission of the message.

7. The method of claim 1, wherein the step of detecting a response indicator comprises detecting a plurality of response indicators and wherein each of the plurality of response indicators comprises a radio-frequency energy transmission randomly generated in time by each of the mobile stations during a predetermined window period following transmission of the message.

8. In a wireless communication system having a plurality of communication cells and a plurality of mobile stations operating in selected ones of the plurality of communication cells, a method for responding to a page message, the method comprising the steps of:

receiving at a mobile station operating within one of the selected ones of the plurality of communication cells the page message;

detecting at the mobile station an impulse radio-frequency energy transmission generated by a second mobile station in response to the page message; and foregoing generation at the mobile station of a second impulse radio-frequency energy transmission.

9. In a wireless communication system having a plurality of communication cells and a plurality of mobile stations operating within selected ones of the plurality of communication cells, a method for directing a group call request, the method comprising the steps of:

within each cell transmitting a message directed to the plurality of mobile stations;

detecting a response indicator in the selected ones of the plurality of cells, wherein the response indicator comprises an impulse radio-frequency energy transmission generated by at least one the plurality of mobile stations operating within the selected ones of the plurality of cells;

receiving at a second mobile station operating within the one of the selected ones of the plurality of communication cells the message;

detecting at the second mobile station the impulse radio-frequency energy transmission from the mobile station; and foregoing generation at the second mobile station of a second impulse radio-frequency energy transmission.

10. The method of claim 9, wherein the wireless communication system comprises a code division multiple access communication system.

11. The method of claim 9, wherein the message comprises a broadcast page message.

12. The method of claim 9, wherein the step of detecting a response indicator comprises detecting the impulse radio-frequency energy transmission during a predetermined detection window period following transmission of the message.

* * * * *